United States Patent [19]
Hooley et al.

[11] 4,446,600
[45] May 8, 1984

[54] MACHINE FOR STRIPPING MEAT FROM FOWL LEG AND THIGH BONES

[76] Inventors: Eldon R. Hooley, P.O. Box 421, Creswell, Oreg. 97426; David L. Dodge, 77799 Sunset Dr., Cottage Grove, Oreg. 97424

[21] Appl. No.: 378,497
[22] Filed: May 17, 1982
[51] Int. Cl.³ .................................................. A22C 21/00
[52] U.S. Cl. ........................................ 17/11; 17/1 G
[58] Field of Search .............................. 17/1 G, 11, 46

[56]  References Cited
U.S. PATENT DOCUMENTS

| 4,327,463 | 5/1982 | Martin | 17/11 |
| 4,377,884 | 3/1983 | Viscolosi | 17/11 |

Primary Examiner—Willie G. Abercrombie
Attorney, Agent, or Firm—James D. Givnan, Jr.

[57] ABSTRACT

A machine including a bone press cylinder with a rod member for axial displacement of the main bone of a fowl part. Stripping blades are driven by blade cylinders into lateral engagement with the fowl part bone. A shear blade severs remaining tendons and ligaments from the dislodged bone. Bone guides confine the part bone for axial passage past the stripping blades and shear blade. The bone press cylinder rod member carries a cam equipped plate the cams of which actuate, in sequence, the various powered blades of the machine. The stripping blades, shear blade and bone guides are all mounted on a detachable member of the machine to permit convenient removal for cleaning and maintenance purposes.

6 Claims, 7 Drawing Figures

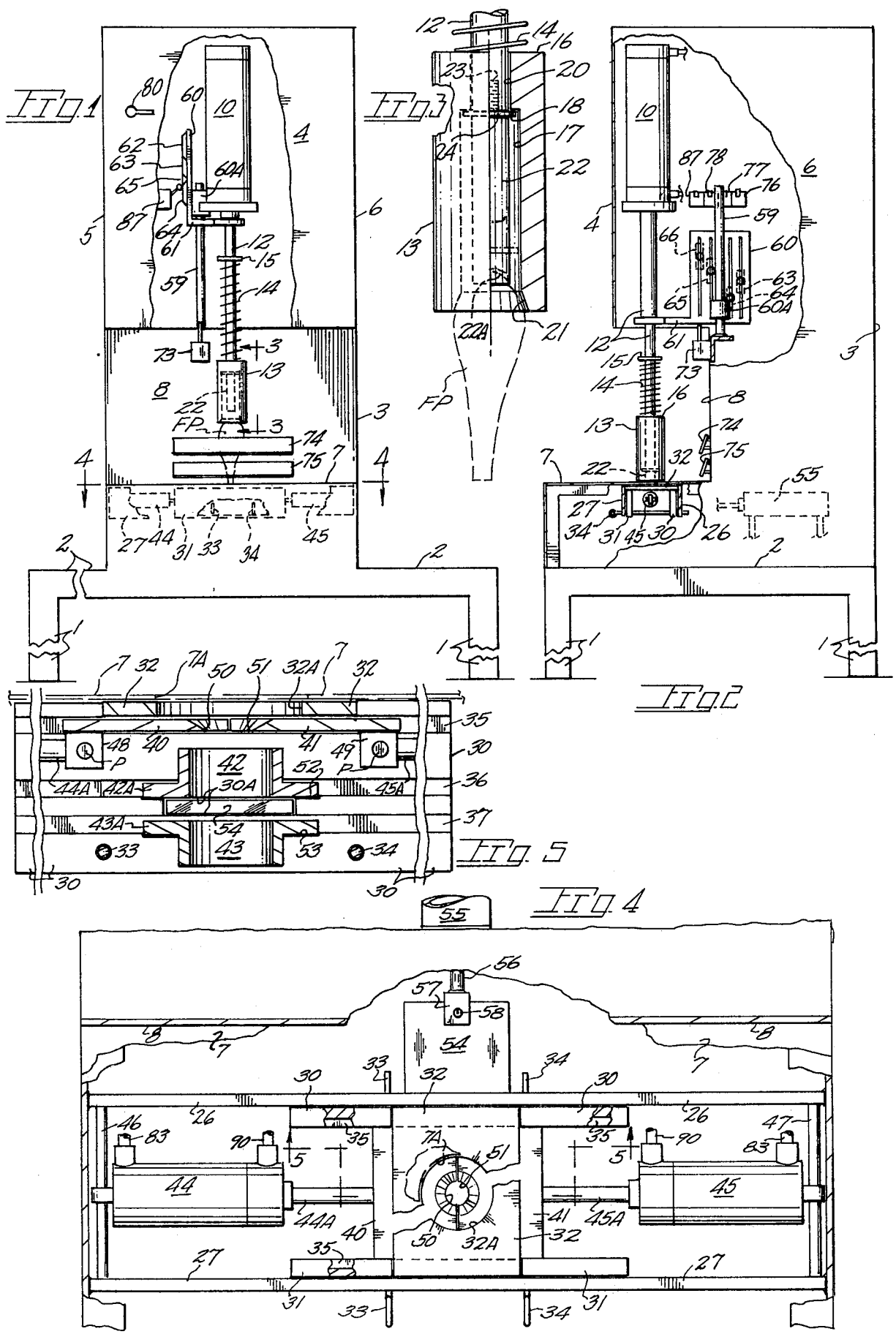

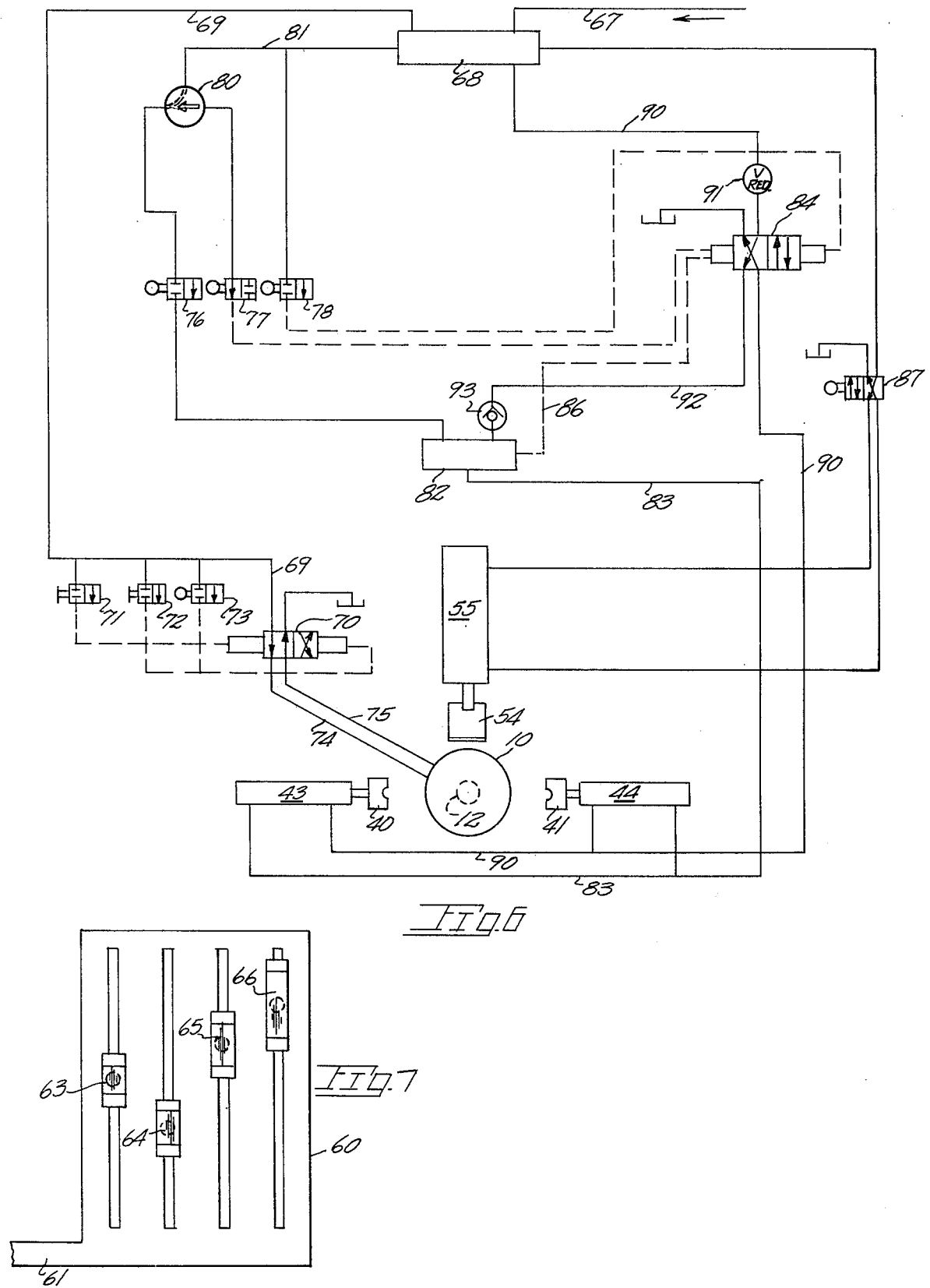

MACHINE FOR STRIPPING MEAT FROM FOWL LEG AND THIGH BONES

BACKGROUND OF THE INVENTION

The present invention concerns a machine for stripping meat from a fowl leg or thigh bone by driving the bone thereof past cooperating stripping elements. The known prior art includes several machines which have as their purpose the removal of flesh from the lower leg and/or thigh bones of fowl.

In the poultry industry, it has been found commercially beneficial to market poultry meat to the consumer with the bone removed. Further, bone removal greatly facilitates frozen storage of the meat with little or no degradation of meat quality. Shipping and retailing of the end product also benefit from bone removal.

The known prior art includes the patents to Segur et al and Segur U.S. Pat. Nos. 3,510,908 and 3,216,056 respectively. The former patent discloses a stationary plate which is shaped so as to strip meat from a bone gripped at one end by clamping members which thereafter draws the bone past the stationary stripping plate. The remaining Segur patent discloses cooperating jaws which engage bone ends while manual stripping is performed. U.S. Pat. No. 3,672,000 to Martin et al is of interest in that a first pair of blades move horizontally to engage and hold a bone end while a second pair of blades close against and thereafter are drawn along the bone to strip the meat. The mechanism is very complex with a lengthy cycling time.

U.S. Pat. No. 2,893,051 to Massengill is of interest for the reason it discloses cooperating pushing and pulling components acting axially on the bones of a ham to move the ham past a stationary stripping blade. The stripping is terminated by a blade normal to the bone path severing remaining tendons and ligaments.

U.S. Pat. No. 3,486,187 to Zwiep et al shows a traveling "plow" which severs meat from a suspended large animal bone.

SUMMARY OF THE PRESENT INVENTION

The present invention is embodied in a machine in which provision is made for supporting and driving disjointed fowl leg parts past stripping blades.

The machine includes a pneumatic pressing cylinder having a piston rod end equipped with a resiliently mounted holder which serves to yieldably stabilize the upper end of a fowl part during driving of same past the stripping blades. The stripping blades or elements are embodied in cooperating, powered blades which open and close during a stripping cycle of operation in a timed automatic sequence coordinated with the position of the piston rod and the pressing of the bone past the blades. The above mentioned blades are part of a stripping mechanism which includes a blade member for shearing tendons or ligaments. The stripping mechanism is removably mounted beneath a word table of the machine for ease of maintenance and cleaning. Interchangeable bone guides in the stripping mechanism serve to guide both drumstick and thigh bones to assure axial passage of same while being moved by piston rod exerted pressure.

A cam bearing plate is equipped with a series of adjustable cams which move past and actuate valve assemblies to control machine components in a desired sequence.

Objectives of the present invention include the provision of a machine for stripping fowl parts, particularly the separated lower leg and the thigh, by the powered displacement of the part bone past stripping blades; the provision of a holder within which is stabilized the upper end of a fowl bone to enable the application of force to the bone end to the degree that the bone may be forcefully driven past stripping blades; the provision of a holder which is yieldably mounted to the end of a piston rod member to permit the rod member to continue its travel past the stripping blade to fully displace the bone away from the stripped meat; the provision of a machine for stripping meat from fowl bones which is automatic in operation requiring the operator to simply seat one end of the fowl part between the stripping blades and hold the part upright until the remaining end is engaged by the cylinder driven holder; the provision of a machine including a cylinder mounted part holder which permits a degree of lost motion between the holder and the rod on which it is mounted to enable the operator to position the part for engagement by the descending holder without risk of injury; the provision of a meat stripping machine wherein a stripping mechanism is held in place by locking pins which permit rapid removal of the mechanism for periodic cleaning and for maintenance work.

BRIEF DESCRIPTION OF THE DRAWING

In the accompanying drawing:

FIG. 1 is a front elevational view of the present machine with parts broken away for purposes of illustration;

FIG. 2 is a side elevational view of FIG. 1;

FIG. 3 is a vertical elevational view taken along line 3—3 of FIG. 1;

FIG. 4 is a horizontal plan view taken downwardly along line 4—4 of FIG. 1;

FIG. 5 is a vertical sectional view taken along irregular line 5—5 of FIG. 4;

FIG. 6 is a schematic view of the present machine's pneumatic system, and

FIG. 7 is an elevational view of the cam plate of the machine.

DETAILED DESCRIPTION OF THE PREFERRED EMBODIMENT

With continuing reference to the drawing wherein applied reference numerals indicate parts similarly hereinafter identified, the reference numeral 1 indicates ground supported leg members of the present machine which terminate upwardly in platforms 2 located on opposite sides of a machine housing 3. Housing 3 includes a front wall 4, side walls 5 and 6 all supported by a machine framework (not shown) of welded construction. A work table surface at 7 defines a central aperture 7A in FIG. 5. An upright, rearwardly offset wall at 8 of the housing also conceals machine components. The work table surface 7 and platform surfaces 2 are at a convenient height for the operator.

A double acting pneumatic cylinder at 10 is termed a bone press cylinder and is suitably supported in an upright manner by machine framework. A cylinder piston rod 12 carries at its lower end a fowl part holder 13. A helical spring at 14 is confined intermediate a rod mounted stop at 15 and the uppermost surface 16 of the holder and serves to downwardly bias said holder. The holder defines an axial bore 17 which terminates upwardly in a shoulder 18 with a reduced diameter bore at 20 slidably receiving the lower end of piston rod 12. An upwardly and inwardly surface at 21 of the holder provides an inclined annular surface engageable with the inserted extremity of a fowl part FP such as a leg or thigh. Holder 13 is attached to piston rod 12 by a rod extension at 22 (FIG. 3) in screwed engagement at 23 with the piston rod end. Shoulder 18 of the holder is normally in rested abutment with a disk 24 on the piston rod. From this it will be seen that holder 13 is biased downwardly by helical spring 14 in a resilient manner to permit simultaneous downward movement of piston rod 12, its extension 22 and holder 13 until the holder comes into contact with table surface 7. The upper portion of a fowl leg or thigh is centered by holder 13 to assure substantial axial alignment between the fowl part, piston rod 12 and a later described pair of stripping blades. The lower end of rod extension 22 is concave at 22A for bone centering purposes.

STRIPPING MECHANISM

The machine includes balde elements which automatically open and close about the bone of the fowl part and serve to strip the flesh from the bone as the bone is propelled past the blade elements by cylinder 10. Said stripping mechanism is located immediately below work table surface 7 and disposed between a pair of machine frame members at 26 and 27. A pair of rail members at 30 and 31 are joined by an apertured plate 32 having an aperture 32A. For ease of removing the stripping mechanism, aligned apertures in the rail members and the machine frame members receive locking pins at 33-34. The rail members each have opposing, inwardly facing, lengthwise extending channels typically at 35, 36 and 37 in FIG. 5. These pairs of channels receive, from top to bottom, cooperating stripper blades at 40 and 41 and upper and lower circular bone guides 42 and 43. The blades are actuated simultaneously by double acting pneumatic cylinders at 44 and 45 having piston rods 44A-45A. The base end of each stripper blade cylinder is mounted by means of bars at 46 and 47 on the machine frame. Removal of the stripper blade elements from the rails is accomplished by removal of pins P (FIG. 5) from sockets 48-49 on the blade undersides whereupon the blades may be slid outwardly toward the rail ends. Each stripper blade has a semi-circular knife edge as at 50 and 51 which jointly define an opening through which the bone may pass as well as the rod end 22 of bone press cylinder 10.

Additional pairs of channels as at 36 and 37 in the rails slidably receive flanges 42A-43A of the bone guides. To retain the guides against lateral shifting, the channel defining edges of the rail members are somewhat recessed as at 52 and 53. The bone guides are utilized in pairs to confine a bone against lateral displacement with bone guide collar portions being of somewhat larger diameter for processing fowl thighs or femurs than like guides used for processing fowl tibias. Substitution of the guides, if necessary, is readily achieved by sliding of the guides lengthwise out of rail engagement. It is feasible, in some instances, to use the same guides for both of the above fowl parts.

A tendon shearing blade at 54 is slidably supported by the rail assembly with rail 30 within a slotted area 30A to receive the blade disposed for sliding movement normal to the rails. The bone guides 42-43 are located immediately above and below the shear blade 54. A shearing blade actuating cylinder at 55 is of the double acting pneumatic type having a rod 56 removably coupled to the blade rearward edge by a clevis 57 and pin 58. The base of cylinder 55 is suitably supported by machine framework. Blade 54 is cycled to cause its edge to sever tendons and ligaments after displacement of the bone below the horizontal plane of the blade.

For automatic operation of a later described pneumatic system, we provide a cam carrying plate at 60 which is carried by piston rod 12 of bone press cylinder 10 by means of a rod attached cam bracket 61. A frame supported post 59 and a plate mounted slide bearing 60A guide the cam plate for vertical travel. The cam plate adjustably mounts several cams at 62, 63, 64 and 65 which move in a vertical path to actuate a row of later described valve assemblies for automatic operation of air operated components of the machine.

BONE PRESS CYLINDER ACTUATING SYSTEM

The pneumatic system includes an inlet line or source 67 of system air pressure supplying a manifold 68. An air line 69 from the manifold serves double acting cylinder 10 via a pilot operated, four-way valve at 70. Controlling pilot operated valve 70 is a series of three valves 71, 72 and 73. Valves 71 and 72 are manually operated with their levers coupled to trigger plates 74 and 75 (FIG. 1) hingedly mounted on the machine housing for operator start and emergency reverse actuation of the bone press cylinder. Valve 73 is located on the machine frame (FIG. 2) for actuation by contact with descending cam plate bracket 61 at the lower limit of rod and cam plate travel for automatic reversal of cylinder 10 and the retraction stroke of rod 12. Valve 72 is termed an emergency return valve to permit the operator to immediately reverse piston rod travel at any point during the rod down stroke. Air lines 74-75 communicate valve 70 with the opposite ends of bone press cylinder 10.

STRIPPING BLADE ACTUATION SYSTEM

The stripping blade components of the system are controlled automatically by cams 63, 64 and 65 on cam plate 60 which actuate articulated lever equipped valves 76, 77, 78 which in turn control stripping blade actuating cylinders 43 and 44. The articulated lever on cam actuated valve 76 is actuated only during cam downward passage. The articulated levers on cam actuated valves 77, 78 and 87 are actuated only during upward cam travel. Directing air at source pressure, 90 PSI or so, toward cylinders 43-44 is a manual selector valve 80 which is positionable into a first mode for stripping fowl thighs (femurs) and a second mode for stripping fowl drumsticks (tibias).

With valve 80 set to direct pressure from manifold line 81 to cam actuated valve 76, in accordance with the first mode (stripping of thighs), momentarily directs air, when cam actuated during cylinder downstroke, to a second manifold at 82 and thence via branched line 83 to blade stripping cylinders 43-44 to close the associated stripping blades 40-41 under system pressure just above the thigh bone distal knuckle in rested placement on uppermost bone guide 42. Pressure is bled from manifold 82 via a line 86 to the pilot of a pilot operated valve at 84 to open same to provide a continuing but reduced pressure source of air pressure via lines 92 and 83 to cylinders 43-44 after valve 76 returns to the closed position upon cam passage. During such a sequence it will be remembered that cam plate 60 is moving continuously in a downward direction. Subsequently, piston rod carried cam bracket 61 actuates valve 73 to cause pilot operated valve 70 to shift to reverse the travel of piston rod 12. At the lower extreme of rod travel, the end of rod 12 will be below shear blade 54. As aforesaid, upon contact of cam plate bracket 61 with valve 73 bone press cylinder 10 will reverse the travel of piston rod 12. During the upward return travel of cam plate 60, cam 66 thereon actuates valve 87 shifting same to direct pressurized air to the base end of cylinder 55 to cause shear blade 54 to be driven intermediate the bone guide members. The lowermost end of piston rod 12 will, of course, have been retracted upwardly from the shear blade path. During the continued upward travel of cam plate 60, cam 65 thereon will come into actuating contact with lever operated valve 78 to shift same admitting a pressurized flow to the pilot of valve 84 causing same to reposition to admit air pressure via line 90 to the rod ends of cylinders 43 and 44 to open stripping blades 40 and 41 to complete a first mode of operation wherein a thigh has been stripped of its meat. The thigh bone or femur will have been discharged below the stripping mechanism while the meat will be collected on table surface 7 above the stripping blades. For purposes of retaining stripping blades 40 and 41 in a closed position about a fowl thigh, air line 86 serves to admit pressure to the pilot operated valve 84 to keep the stripping jaws closed under air pressure reduced by a reducing valve 91 to enable the jaws to yield outwardly during rod driven passage therepast of the proximal knuckle of the thigh.

With valve 80 repositioned to accomplish the second mode of machine operation, i.e., the stripping of fowl tibias, system pressure is admitted to valve 77 with valve 76 being isolated. System pressure passes via normally open valve 77 to actuate pilot operated valve 84 with reduced air pressure passing via lines 92 and 83 to the base ends of cylinders 43 and 44. Accordingly, stripping blades 40 and 41 are closed at the start of a tibia stripping operation and receive the knuckle severed distal end of the tibia inserted in the blade defined opening. Manual actuation of valve 71 causes bone press cylinder 10 to extend bone press piston rod 12 to displace the part bone past and beyond the stripping blades. At the lower extreme of travel, cam plate bracket 61 will actuate valve 73 to shift pilot operated valve 70 resulting in retraction of the bone press piston rod 12. During such upward travel, cam 66 will come into actuating contact with valve 87 to cause the piston rod of shear cylinder 55 to position shear blade 54 intermediate the bone guides. Continued upward travel of cam plate 60 will result in cam 65 thereon actuating valve 78 to direct pressure to the pilot of valve 84 to shift same to permit a reduced pressure flow to pass via line 90 to blade cylinders 43 and 44 to open same. Still further upward movement of the cam plate and cam 65 thereon will result in disengagement of cam 65 from valve 78. Cam 64 will move upwardly to actuate valve 77 to shift pilot operated valve 84 to admit pressure via line 92 via check valve 93, manifold 82 and line 83 to the base end of cylinders 43–44 permitting the stripping blades to close to complete second mode operation.

While we have shown but one embodiment of the invention it will be apparent to those skilled in the art that the invention may be embodied still otherwise without departing from the spirit and scope of the invention.

Having thus described the invention, what is desire to be secured under a Letters Patent is:

We claim:

1. A machine for pressing a bone from a fowl part, said machine comprising,
   a prime mover including a movable rod member for rectilinear travel, said rod member engageable at one end with the end of a bone in the fowl part,
   a holder yieldably carried by said rod member for endwise engagement with a fowl part, said holder adapted for displacement relative the rod member during travel of said rod member to permit extension of said rod member end past said holder after the latter has come into abutment with a machine component, and
   a stripping mechanism including cooperating blade members, means urging said blade members into and out of engagement with the bone of a fowl part, said stripping mechanism further including rail members on which said blade members are slidably mounted, means removably coupling said rail members on framework components of the machine to facilitate periodic removal and cleaning of the stripping mechanism, guide means confining the part bone against lateral movement during passage therepast with the bone in substantial alignment with said rod member, said guide means including spaced apart bone guides each having a collar portion of a size to permit laterally confined passage of a part bone, said guides mounted on said rail members in a detachable manner permitting the substitution of like guide means for the laterally confined passage of the bone of a different fowl part, shear means actuable to sever fowl part tendons subsequent to bone displacement beyond said blade members by said rod member.

2. The machine claimed in claim 1 wherein said holder has an inclined annular surface defining an opening at its fowl part engaging end within which a fowl part extremity is inserted to hold the part bone in substantial alignment with said rod member.

3. The machine claimed in claim 2 additionally including resilient means carried by said rod member and acting on said holder to bias same toward part engagement, said holder slidably mounted on said rod member to permit rod member extension therepast during a bone pressing operation.

4. The machine claimed in claim 1 wherein said spaced apart bone guides are oppositely disposed from said shear means.

5. The machine claimed in claim 1 additionally including removable locking pins coupling said rail members to the machine framework enabling said removal without tools being required.

6. The machine claimed in claim 1 additionally including a plate member carried by said rod member and movable along a rectilinear path, a plurality of valves in place on said machine, valve actuating means carried by said plate and actuating said valves, blade air cylinders one each coupled to each of said blade members, a shear air cylinder coupled to said shear means, said valves in valve controlled communication with the blade air cylinders and the shear air cylinder to control operation of same during rectilinear movement of said rod member.

* * * * *